United States Patent
Eberling et al.

(10) Patent No.: US 9,758,140 B2
(45) Date of Patent: Sep. 12, 2017

(54) SYSTEM AND METHOD FOR CONTROLLING PNEUMATIC CONTROL SIGNAL

(71) Applicant: Bendix Commercial Vehicle Systems LLC, Elyria, OH (US)

(72) Inventors: Charles E Eberling, Wellington, OH (US); Travis G Ramler, Tustin, CA (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

(21) Appl. No.: 14/971,195

(22) Filed: Dec. 16, 2015

(65) Prior Publication Data

US 2017/0174197 A1 Jun. 22, 2017

(51) Int. Cl.
*B60T 11/32* (2006.01)
*B60T 13/40* (2006.01)

(52) U.S. Cl.
CPC ........... *B60T 11/326* (2013.01); *B60T 13/403* (2013.01); *B60T 2270/403* (2013.01)

(58) Field of Classification Search
CPC ...... B60T 11/326; B60T 13/40; B60T 13/403; B60T 13/26; B60T 13/263; B60T 2270/403
USPC ........... 303/3, 7, 123, 122.09, 122.1, 122.15
See application file for complete search history.

(56) References Cited

U.S. PATENT DOCUMENTS

| | | | |
|---|---|---|---|
| 4,586,584 A * | 5/1986 | Auman | B60T 13/263 180/271 |
| 5,042,883 A | 8/1991 | McCann et al. | |
| 5,046,786 A | 9/1991 | Johnston et al. | |
| 5,061,015 A * | 10/1991 | Cramer | B60T 13/263 303/15 |
| 5,251,967 A * | 10/1993 | Eberling | B60T 13/263 303/7 |
| 5,577,814 A | 11/1996 | Engelbert et al. | |
| 6,247,764 B1 | 6/2001 | Koelzer | |

(Continued)

FOREIGN PATENT DOCUMENTS

| | | | | |
|---|---|---|---|---|
| DE | EP 0205928 A1 * | 12/1986 | | B60T 13/683 |
| DE | 102005018888 A1 | 11/2006 | | |

(Continued)

OTHER PUBLICATIONS

Bendix® TP-3® Tractor Protection Valve Service Data, SD-03-3652, BW1572, Sep. 2012.

(Continued)

*Primary Examiner* — Thomas J Williams
(74) *Attorney, Agent, or Firm* — Brian E. Kondas; Cheryl L. Greenly; Eugene E. Clair

(57) ABSTRACT

An electronic controller includes an electrical input and an electrical output. The electronic controller is adapted to receive an electronic status signal at the electrical input. The electronic status signal is indicative of a pneumatic pressure in a supply line communicating pneumatic fluid between a towing portion of a vehicle and a towed portion of the vehicle. The electronic controller is also adapted to transmit an electronic control signal from the electrical output to an associated valve, based on the electronic status signal, for controlling delivery of a pneumatic control signal from the towing portion of the vehicle to the towed portion of the vehicle.

35 Claims, 2 Drawing Sheets

(56) References Cited

U.S. PATENT DOCUMENTS

| | | |
|---|---|---|
| 6,386,649 B1 | 5/2002 | Ross |
| 6,655,750 B2 | 12/2003 | Soupal |
| 7,309,111 B2 | 12/2007 | Herges et al. |
| 7,823,441 B2 | 11/2010 | Beverly et al. |
| 8,078,378 B2 | 12/2011 | Bradley |
| 8,260,520 B2 | 9/2012 | Eberling |
| 8,282,173 B2 | 10/2012 | Förster et al. |
| 8,290,679 B2 | 10/2012 | Bensch et al. |
| 8,297,712 B2 | 10/2012 | Bensch et al. |
| 8,297,713 B2 | 10/2012 | Soupal |
| 8,512,208 B2 | 8/2013 | Hilberer |
| 8,540,323 B2 | 9/2013 | Broch et al. |
| 8,672,421 B2 | 3/2014 | Eidenschink et al. |
| 8,864,247 B2 | 10/2014 | Hilberer |
| 2008/0258542 A1* | 10/2008 | Soupal ............... B60T 7/20 303/7 |
| 2010/0237690 A1* | 9/2010 | Forster ............... B60T 7/20 303/13 |
| 2011/0057507 A1 | 3/2011 | Frediani |
| 2011/0168505 A1 | 7/2011 | Hilberer |

FOREIGN PATENT DOCUMENTS

| | | | |
|---|---|---|---|
| EP | 2059423 B1 | 10/2010 | |
| EP | 2197715 B1 | 9/2011 | |
| GB | 2131509 A * | 6/1984 | ............ B60T 8/1887 |

OTHER PUBLICATIONS

Bendix® TP-5™ Tractor Protection Valve Service Data, SD-03-3655, BW1575, May 2011.

\* cited by examiner

SYSTEM AND METHOD FOR CONTROLLING PNEUMATIC CONTROL SIGNAL

BACKGROUND

The present invention relates to a tractor protection function for an articulated vehicle. It finds particular application in conjunction with using an electronically controlled modulator for providing the tractor protection function and will be described with particular reference thereto. It will be appreciated, however, that the invention is also amenable to other applications.

Air brake systems are commonly used for articulated vehicles including a tractor that tows at least one trailer. Such systems include a tractor protection valve that controls air supply to brakes on the trailer. The tractor protection valve receives an air signal from a park brake control valve that is typically mounted to a dash (e.g., a dashboard) in the tractor. The air signal from the park brake control valve can be used to apply or release trailer spring brakes, which are also referred to as trailer parking or trailer emergency brakes, and can be used to charge or re-supply trailer reservoirs, which normally comprise primary and secondary air sources on the tractor. The tractor protection valve also receives air signals from a service brake foot valve and/or a trailer hand control valve, which are utilized by an operator of the vehicle to apply or release trailer service brakes.

If there is insufficient air pressure in the parking brake or re-supply portion of the tractor protection valve, the tractor protection valve is configured to prevent air from being delivered from the tractor to the trailer through a service brake portion of the tractor protection valve. This prevents both the parking and service brakes being simultaneously applied (e.g., compounding of the trailer spring brakes) and protects a tractor air supply by blocking a loss of air pressure out of a service control line in the event that a connection line between the tractor and trailer is inadvertently disconnected or a leak exists in the trailer air line.

Conventionally, the tractor protection function is achieved using a dedicated pneumatic tractor protection valve on the tractor for protecting air loss in the above-described situations. The service brake portion of the pneumatic tractor protection valve includes a normally-closed valve for controlling communication of the air from the tractor for controlling the trailer service brakes. The normally-closed valve only opens when sufficient pressure is present in the parking brake or re-supply portion of the tractor protection valve.

The present invention provides a new and improved apparatus and method for protecting air supplied from a tractor to a trailer in the event a connection line between the tractor and trailer is disconnected or a leak exists in the trailer air line.

SUMMARY

In one embodiment, an electronic controller includes an electrical input and an electrical output. The electronic controller is adapted to receive an electronic status signal at the electrical input. The electronic status signal is indicative of a pneumatic pressure in a supply line communicating pneumatic fluid between a towing portion of a vehicle and a towed portion of the vehicle. The electronic controller is also adapted to transmit an electronic control signal from the electrical output to an associated valve, based on the electronic status signal, for controlling delivery of a pneumatic control signal from the towing portion of the vehicle to the towed portion of the vehicle.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
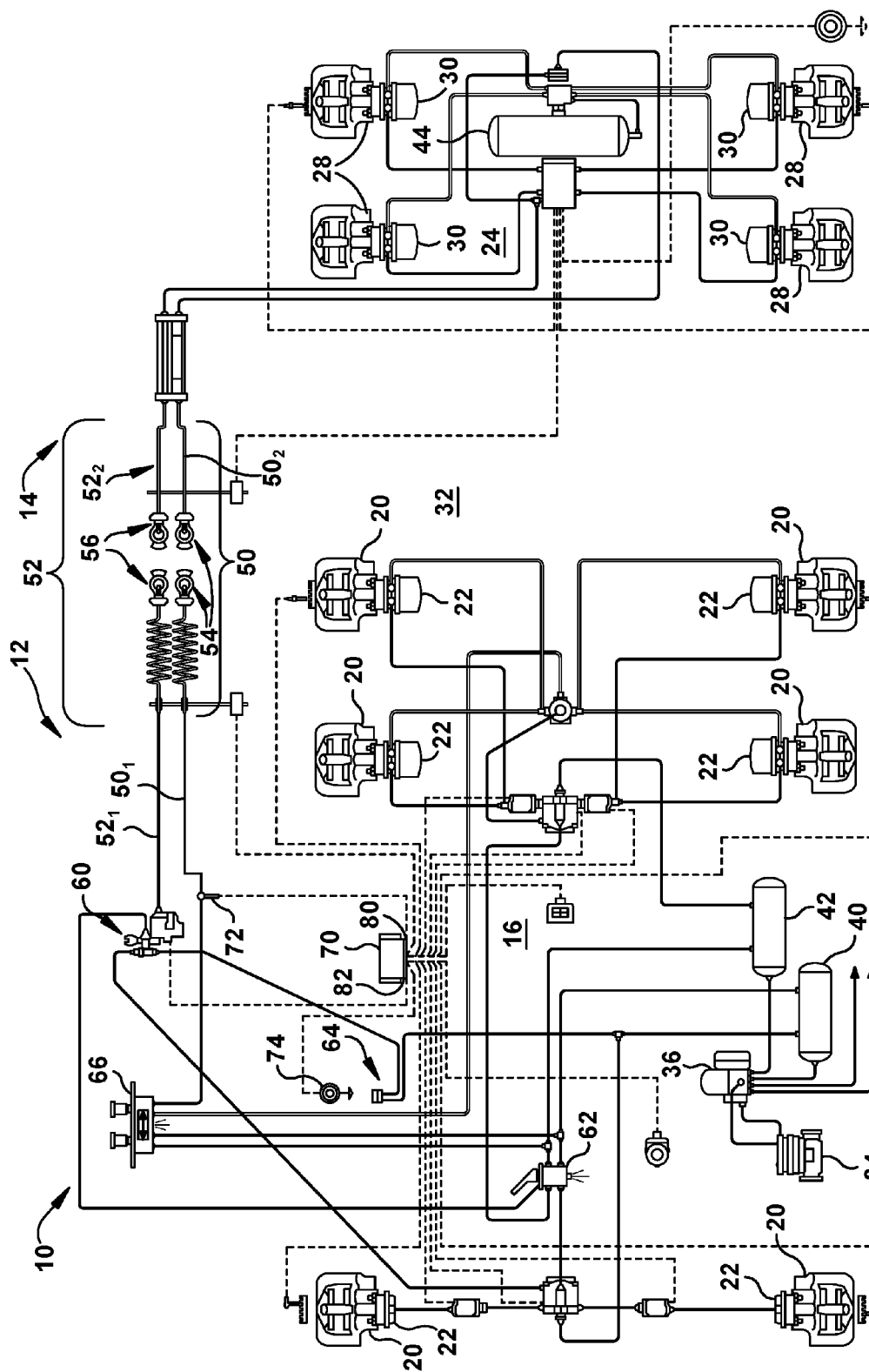
FIG. 1 illustrates a schematic representation of a vehicle including a system for controlling a pneumatic control signal communicated between a tractor portion of the vehicle and a trailer portion of the vehicle in accordance with one embodiment of an apparatus illustrating principles of the present invention.

With reference to FIG. 1, a simplified component diagram of an exemplary vehicle 10 is illustrated in accordance with one embodiment of the present invention. In the illustrated embodiment, the vehicle 10 is articulated and includes a tractor portion 12 (e.g., a tractor) and a trailer portion 14 (e.g., a trailer). The tractor 12 includes a tractor brake system 16, which includes tractor service brakes 20 and tractor parking brakes 22. The trailer 14 includes a trailer brake system 24, which includes trailer service brakes 28 and trailer parking brakes 30 (e.g., trailer emergency brakes). The vehicle 10 includes a system 32 for controlling a pneumatic control signal communicated between the tractor 12 and the trailer 14.

Both the tractor brake system 16 and the trailer brake system 24 are pneumatic brake systems, which use a pneumatic fluid (e.g., compressed air) for controlling the tractor service brakes 20, the tractor parking brakes 22, the trailer service brakes 28, and the trailer parking brakes 30. The compressed air is generated on the tractor 12 by a compressor 34, cleaned and dried using an air dryer 36, and stored in tractor reservoir tanks 40, 42. The compressed air is fluidly communicated from the tractor reservoir tanks 40, 42 to a trailer reservoir tank 44 via fluid connections, which include a supply line 50 and a control line 52, between the tractor 12 and the trailer 14. The supply line 50 includes a first trailer supply line $50_1$, which is on the tractor 12, and a second trailer supply line $50_2$, which is on the trailer 14. The first and second trailer supply lines $50_{1,2}$ fluidly communicate with each other via a supply line connector 54. The control line 52 includes a first trailer control line $52_1$, which is on the tractor 12, and a second trailer control line $52_2$, which is on the trailer 14. The first and second trailer control lines $52_{1,2}$ fluidly communicate with each other via a control line connector 56. The supply line connector 54 includes a seal for creating an air-tight connection between the first trailer supply line $50_1$ and the second trailer supply line $50_2$. The control line connector 56 includes a seal for creating an air-tight connection between the first trailer control line $52_1$ and the second trailer control line $52_2$. The supply line connector 54 and the control line connector 56 are referred to as glad-hands.

The compressed air is communicated from at least one of the tractor reservoir tanks 40, 42 to the first trailer control line $52_1$ via a valve 60. At least one of a service foot brake control valve 62 and a service hand brake control valve 64 is/are positioned between the tractor reservoir tanks 40, 42 and both the tractor service brakes 20 and the valve 60. The at least one of the service foot brake control valve 62 and the service hand brake control valve 64 control(s) the communication of the compressed air from the at least one reservoir tank 40, 42 to the tractor service brakes 20 and the valve 60 based on respective levels an operator of the vehicle 10 activate(s) the at least one of the service foot brake control valve 62 and the service hand brake control valve 64. It is contemplated that the tractor service brakes 20 are applied based on how far the operator of the vehicle 10 depresses (e.g., activates) the service foot brake control valve 62. In other words, the level of pneumatic fluid delivered to the tractor service brakes 20 increases as the operator of the vehicle 10 depresses (e.g., activates) the service foot brake control valve 62, which increases the level of braking applied by the tractor service brakes 20. Similarly, if the valve 60 is in an open state, as discussed in more detail below, the pneumatic fluid is passed to the trailer service brakes 28, which are applied based on how far the operator of the vehicle 10 depresses (e.g., activates) the service foot brake control valve 62 and/or how much the operator of the vehicle 10 activates (e.g., opens) the service hand brake control valve 64.

The compressed air is communicated from at least one of the tractor reservoir tanks 40, 42 to the first trailer supply line $50_1$ via a supply control valve 66 which, in one embodiment, is included on a dash (e.g., a dashboard) of the vehicle 10. In one embodiment, the supply control valve 66 is controlled by the operator of the vehicle 10 and is part of a dash control module referred to as the MV-3 dash control module by Bendix Commercial Vehicle Systems LLC. For example, the operator of the vehicle controls the supply control valve 66 to supply the pneumatic fluid to the first trailer supply line $50_1$ and, consequently, the second trailer supply line $50_2$ for releasing the trailer parking brake 30. Conversely, the operator of the vehicle controls the supply control valve 66 to prevent the pneumatic fluid from being supplied to the first trailer supply line $50_1$ and, consequently, the second trailer supply line $50_2$ for applying the trailer parking brake 30.

In one embodiment, the valve 60 is included as part of an electronic control system (e.g., an antilock braking system (ABS), an electronic stability program (ESP), an electronic stability control (ESC) system, an adaptive cruise with braking (ACB) system, etc). An electronic controller 70 (electronic control unit (ECU)) electronically controls the valve 60. In one embodiment, the ECU 70 is also part of the electronic control system for automatic braking (e.g., an ABS controller, an ESP controller, an ESC controller, an ACB controller, etc). Other embodiments, in which the ECU 70 is not a part of the electronic control system, are also contemplated.

A pressure sensor 72 measures a pressure of the pneumatic fluid in the first trailer supply line $50_1$. The pressure sensor 72 communicates an electronic signal (e.g., an electronic status signal) to the ECU 70 indicative of a pressure in the first trailer supply line $50_1$. The ECU 70 transmits an electronic control signal to the valve 60 based on the electronic signal received from the pressure sensor 72, which is indicative of the pressure in the first trailer supply line $50_1$. If the signal received from the pressure sensor 72 indicates the pressure in the first trailer supply line $50_1$ is at least a predetermined supply pressure (e.g., 45 psi), the ECU 70 transmits an electronic control signal to the valve 60 to set the valve 60 to the open state. As discussed in more detail below, it is contemplated that the valve 60 is a normally-open valve, in which case setting the valve 60 to the open state may simply involve maintaining the valve 60 in the open state.

Otherwise, if the signal received from the pressure sensor 72 indicates the pressure in the first trailer supply line $50_1$ is not at least the predetermined supply pressure and, in one embodiment, if service braking is demanded for the tractor 12 and/or the trailer 14, the ECU 70 transmits an electronic control signal to the valve 60 to set the valve 60 to a closed state. It is understood that service braking may be demanded for the tractor 12 and/or the trailer 14 by at least one of the service foot brake control valve 62, the service hand brake control valve 64 and the ECU 70. In the open state, the valve 60 permits the pneumatic fluid received from the at least one of the service foot brake control valve 62 and the service hand brake control valve 64 to pass to the first trailer control line $52_1$ and, consequently, to the second trailer control line $52_2$ for applying the trailer service brakes 28 based on, for example, the pressure of the pneumatic fluid in the second trailer control line $52_2$. Therefore, the pneumatic pressure in the first and second trailer control lines $52_{1,2}$ acts as a pneumatic control signal for the trailer service brakes 28. In the closed state, the valve 60 does not permit (e.g., ceases) the pneumatic fluid received from the at least one of the service foot brake control valve 62 and the service hand brake control valve 64 to pass to the first trailer control line $52_1$, in which case the trailer service brakes 28 are not applied.

In another embodiment, if the signal received from the pressure sensor 72 indicates the pressure in the first trailer supply line $50_1$ is not at least the predetermined supply pressure, the ECU 70 transmits the electronic control signal to the valve 60 to set the valve 60 to a closed state regardless of whether service braking is demanded for the tractor 12 and/or the trailer 14. In this case, the valve 60 is rated for receiving a continuous signal (e.g., current) to maintain the valve 60 in the closed state. For example, the valve 60 would be maintained in a continuous closed state if the tractor 12 is operating without a trailer 14 (e.g., bob-tail).

In one embodiment, the valve 60 is a solenoid valve which, as described above, is set to the open and closed states to deliver the pneumatic fluid to the first trailer supply line $50_1$ and, consequently, to the second trailer supply line $50_2$. The rate at which the valve 60 is opened and closed (e.g., modulated) is controlled by the ECU 70. For example, during a vehicle event (e.g., an automatic braking event) controlled by the electronic control system (e.g., during an ESP event if the ECU 70 is an ESP controller, during an ESC event if the ECU 70 is an ESC controller, during ACB event if the ECU 70 is an ACB controller, etc.), the ECU 70 may modulate the valve 60 between the open and closed states at a predetermined rate to meet a desired braking effect, if the signal received from the pressure sensor 72 indicates the pressure in the first trailer supply line $50_1$ is at least the predetermined supply pressure. On the other hand, during times when no vehicle event is occurring (e.g., during a non-ESP event, a non-ESC event, a non-ACB event, etc.), the ECU 70 may simply set the valve 60 to the open state, if the signal received from the pressure sensor 72 indicates the pressure in the first trailer supply line $50_1$ is at least the predetermined supply pressure. As discussed above, the ECU 70 will set the valve 60 to the closed state, if the signal received from the pressure sensor 72 indicates the pressure in the first trailer supply line $50_1$ is not at least the predetermined supply pressure and if service braking is demanded for the tractor 12 and/or the trailer 14.

If the signal received from the pressure sensor 72 indicates the pressure in the first trailer supply line $50_1$ is not at least the predetermined supply pressure, it is assumed the trailer parking brake 30 is engaged, at least one of the glad-hands (e.g., at least one of the supply line connector 54 and the control line connector 56) is no longer creating the respective air-tight seal, and/or the pneumatic fluid is escaping to atmosphere because of a fault (e.g., a leak) in components (e.g., the second trailer supply line $50_2$, the trailer service brakes 28, the trailer parking brake 30, etc.) on the trailer 14 that transmit the pneumatic fluid. In any of these situations, the ECU 70 acts to prevent the pneumatic control signal being communicated from the tractor 12 to the trailer 14. By preventing the pneumatic control signal being communicated to the trailer 14 when the signal from the pressure sensor 72 indicates the pressure in the first trailer supply line $50_1$ is not at least the predetermined supply pressure, the ECU 70 and/or the valve 60 act(s) to protect the pneumatic control signal. The ECU 70 and/or the valve 60 protects the pneumatic control signal by preventing the pneumatic control signal being exhausted to atmosphere if at least one of the glad-hands is no longer creating the respective air-tight seal and/or the pneumatic fluid is escaping to atmosphere because of a fault (e.g., a leak) in components on the trailer 14 transmitting the pneumatic fluid.

The operator of the vehicle 10 is alerted if the electronic status signal received from the pressure sensor 72 indicates the pressure in the first trailer supply line $50_1$ is not at least the predetermined supply pressure. For example, if the electronic status signal received by the ECU 70 from the pressure sensor 72 indicates the pressure in the first trailer supply line $50_1$ is not at least the predetermined supply pressure, the ECU 70 transmits an alert signal to an indicator 74. It is contemplated that the indicator 74 is positioned to alert the operator of the vehicle 10 that the pressure in the first trailer supply line $50_1$ is not at least the predetermined supply pressure. In one embodiment, the indicator 74 is positioned in an operator compartment (e.g., a cab on the tractor 12) of the vehicle 10. In other embodiments, the indicator 74 may not be positioned in the operator compartment of the vehicle 10, but is positioned so as to alert the operator of the vehicle 10 that the pressure in the first trailer supply line $50_1$ is not at least the predetermined supply pressure.

In one embodiment, the indicator 74 is a visual indicator that illuminates a light to alert the operator of the vehicle 10 that the pressure in the first trailer supply line $50_1$ is not at least the predetermined supply pressure. In this embodiment, the indicator 74 is a light on the dash of the vehicle 10. However, other embodiments are also contemplated in which the visual indicator 74 is positioned outside of the operator compartment. In another embodiment, the indicator 74 is an audible indicator that creates a sound (e.g., a buzzer of chime) to alert the operator of the vehicle 10 that the pressure in the first trailer supply line $50_1$ is not at least the predetermined supply pressure. In another embodiment, the indicator 74 is a haptic indicator that moves (e.g., vibrates) an object (e.g., a steering wheel) on the vehicle 10 to alert the operator of the vehicle 10 that the pressure in the first trailer supply line $50_1$ is not at least the predetermined supply pressure. Other embodiments are also contemplated in which the indicator 74 includes at least one of the visual indicator, the audible indicator, and the haptic indicator.

It is contemplated that the valve 60 is a normally-open valve, such as a normally-open solenoid valve. Since the valve 60 may be modulated between the open state and the closed state, it is also referred to as a modulator valve. If the valve 60 is a normally-open solenoid valve, the ECU 70 may modulate the valve 60 between the open and closed states by alternately not transmitting the electronic control signal to set (maintain) the valve 60 in the open state and transmitting the electronic control signal to set the valve 60 in the closed state. For purposes of discussion, it is contemplated that the absence of the electronic control signal which, if the valve 60 is a normally-open valve, would maintain the valve 60 in the open state, is also considered as the valve 60 receiving a signal.

As discussed above, the embodiment shown in FIG. 1 illustrates respective direct electrical connections between the ECU 70 and the valve 60, the pressure sensor 72, and the indicator 74. In that regard, the ECU 70 includes an electrical input 80 that electrically communicates with the pressure sensor 72 and an electrical output 82 that electrically communicates with the valve 60 and the indicator 74. The electrical input 80 receives the electronic status signal from the pressure sensor 72, and the electrical output 82 transmits the electronic control signal to the valve 60 and the alert signal to the indicator 74. However, other embodiments are also contemplated in which the electrical input 80 and the electrical output 82 of the ECU 70, the valve 60, the pressure sensor 72, and the indicator 74 communicate electronic message signals between each other via a communication bus (e.g., a controller area network (CAN) bus such as a J1939 communication bus, a dedicated CAN bus, etc).

In the embodiments discussed above, it is contemplated that the system 32 for controlling the pneumatic control signal communicated between the tractor 12 and the trailer 14 at least includes the ECU 70, the first trailer supply line $50_k$, the second trailer supply line $50_2$, the supply line connector 54, the first trailer control line $52_1$, the second trailer control line $52_2$, the control line connector 56, the valve 60, the service foot brake control valve 62, the service hand brake control valve 64, the supply control valve 66, and the pressure sensor 72.

In the embodiments discussed above, it is contemplated that at least the ECU 70, the first trailer supply line $50_1$, the second trailer supply line $50_2$, the supply line connector 54, the first trailer control line $52_1$, the second trailer control line $52_2$, the control line connector 56, the valve 60, the service foot brake control valve 62, the service hand brake control valve 64, the supply control valve 66, and the pressure sensor 72 act as a means for controlling fluid communication of the pneumatic control signal between the tractor 12 and the trailer 14 based on the pneumatic pressure in the supply line 50 (e.g., the first trailer supply line $50_1$). In the embodiments discussed above, it is contemplated that at least the indicator 74 acts as a means for alerting the operator in the tractor 12 if the pneumatic pressure in the supply line 50 (e.g., the first trailer supply line $50_1$) is below the predetermined supply pressure.

Figure 2:
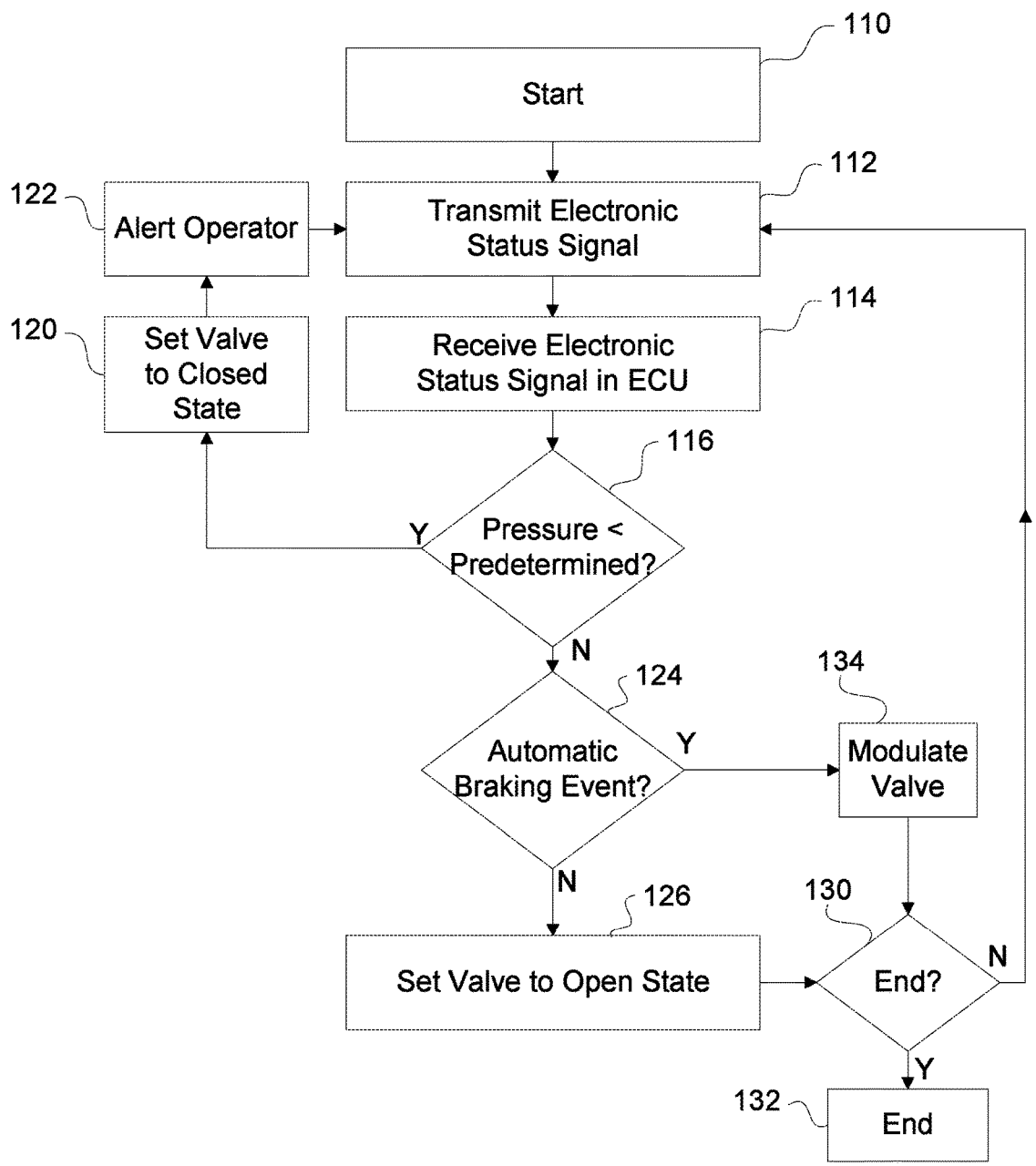
FIG. 2 is an exemplary methodology of controlling the pneumatic control signal communicated between the tractor portion and the trailer portion of the vehicle in accordance with one embodiment illustrating principles of the present invention.

With reference to FIG. 2, an exemplary methodology (e.g., process) of the system shown in FIG. 1 for controlling the pneumatic control signal communicated between the tractor 12 and the trailer 14 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, the method for controlling the pneumatic control signal communicated between the tractor 12 and the trailer 14 starts in a step 110.

The, the electronic status signal indicative of the pressure in the first trailer supply line $50_1$ is transmitted by the pressure sensor 72 in a step 112. The electronic status signal is received by the ECU 70 in a step 114. Based on the electronic status signal received in the step 114, the ECU 70 determines, in a step 116, if the pressure in the supply line 50 (e.g., the first trailer supply line $50_1$) is below the predetermined supply pressure. If it is determined in the step 116 that the pressure in the supply line 50 (e.g., the first trailer supply line $50_1$) is below the predetermined supply pressure, control passes to a step 120 for setting the valve 60 to the closed state. Then, in a step 122, the ECU 70 transmits a signal to activate the indicator 74 for alerting the operator of the vehicle 10 that the pressure in the supply line 50 (e.g., the first trailer supply line $50_1$) is below the predetermined supply pressure. Control then returns to the step 112. If, on the other hand, it is determined in the step 116 that the pressure in the supply line 50 (e.g., the first trailer supply line $50_1$) is not below the predetermined supply pressure, control passes to a step 124.

In the step 124, the ECU 70 determines if an automatic braking event (e.g., an ESP event, an ESC event, an ACB event, etc.) is active. If it is determined in the step 124 that the automatic braking event (e.g., an ESP event, an ESC event, an ABS event, etc.) is not active, control passes to a step 126 for setting the valve 60 to the open state. If the valve 60 is a normally-open valve, the valve 60 is maintained in the open state in the step 126. Control then passes to a step 130 for determining whether the process should end. If it is determined in the step 130 that the process should end (e.g., if a corresponding engine ignition switch of the vehicle 10 is turned-off), control passes to a step 132 to end the process. Otherwise, if it is determined in the step 130 that the process should not end, control returns to the step 112.

If, on the other hand, it is determined in the step 124 that the automatic braking event (e.g., an ESP event, an ESC event, an ACB event, etc.) is active, control passes to a step 134 for modulating the valve 60 between the open state and the closed state. Control then passes to the step 130 for determining whether to end the process.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An electronic controller, comprising:
   an electrical input; and
   an electrical output;
   the electronic controller being adapted to:
   receive an electronic status signal at the electrical input, the electronic status signal being indicative of a pneumatic pressure in a supply line communicating pneumatic fluid between a towing portion of a vehicle and a towed portion of the vehicle; and
   transmit an electronic control signal from the electrical output to an associated valve, based on the electronic status signal and a service brake demand, for controlling delivery of a pneumatic control signal from the towing portion of the vehicle to the towed portion of the vehicle.

2. The electronic controller as set forth in claim 1, wherein:
   if the status signal indicates the pneumatic pressure of the pneumatic fluid in the supply line is below a predetermined supply pressure and the service brake is demanded, the electronic controller is adapted to control the electronic control signal to cause the associated valve to cease delivery of the pneumatic control signal to the towed portion of the vehicle; and
   if at least one of the status signal indicates the pneumatic pressure of the pneumatic fluid in the supply line is not below the predetermined supply pressure and the service brake is not demanded, the electronic controller is adapted to control the electronic control signal to cause the valve to deliver the pneumatic control signal to the towed portion of the vehicle.

3. The electronic controller as set forth in claim 2, wherein:
   the service brake is demanded by at least one of a service foot brake control valve, a service hand brake control valve, and the electronic controller.

4. The electronic controller as set forth in claim 1, wherein the electronic controller is adapted to:
   receive the electronic status signal at the electrical input, the electronic status signal being indicative of the pneumatic pressure in the supply line on the towing portion of the vehicle communicating the pneumatic fluid between the towing portion of the vehicle and the towed portion of the vehicle.

5. The electronic controller as set forth in claim 1, wherein the electronic controller is adapted to:
   control the electronic control signal to cause the pneumatic control signal to be modulated while being delivered to the towed portion of the vehicle during an automatic braking system event.

6. The electronic controller as set forth in claim 5, wherein the electronic controller is adapted to:
   modulate the electronic control signal to cause the pneumatic control signal to be modulated while being delivered to the towed portion of the vehicle during the automatic braking system event.

7. The electronic controller as set forth in claim 1, wherein:
   if the status signal indicates the pneumatic pressure of the pneumatic fluid in the supply line is below a predetermined supply pressure, the electronic controller is adapted to control the electronic control signal to cause the associated valve to cease delivery of the pneumatic control signal to the towed portion of the vehicle; and
   if the status signal indicates the pneumatic pressure of the pneumatic fluid in the supply line is not below the predetermined supply pressure, the electronic controller is adapted to control the electronic control signal to cause the valve to deliver the pneumatic control signal to the towed portion of the vehicle.

8. The electronic controller as set forth in claim 7, wherein:
the electronic controller is adapted to control the electronic control signal to cause the valve to open to deliver the pneumatic control signal to the towed portion of the vehicle; and
the electronic controller is adapted to control the electronic control signal to cause the valve to close to cease delivery of the pneumatic control signal to the towed portion of the vehicle.

9. The electronic controller as set forth in claim 8, wherein:
the electronic controller is adapted to transmit the electronic control signal from the electrical output to cause the valve to open to deliver the pneumatic control signal to the towed portion of the vehicle; and
the electronic controller is adapted to not transmit the electronic control signal to cause the valve to close to cease delivery of the pneumatic control signal to the towed portion of the vehicle.

10. The electronic controller as set forth in claim 8, wherein:
the service brake demand is provided from at least one of a foot valve and a hand valve.

11. The electronic controller as set forth in claim 7, wherein the electronic controller is adapted to:
identify the predetermined supply pressure is about 45 psi.

12. The electronic controller as set forth in claim 7, wherein:
if the status signal indicates the pneumatic pressure of the pneumatic fluid in the supply line is below the predetermined supply pressure, the electronic controller is adapted to alert an operator of the vehicle that the pneumatic pressure is below the predetermined supply pressure.

13. A system for controlling a pneumatic control signal communicated between a tractor portion of an articulated vehicle and a trailer portion of the articulated vehicle, the system comprising:
a normally-open valve, on the tractor portion, included in an associated electronic control system;
a supply line, fluidly communicating with the valve on the tractor portion, communicating a pneumatic fluid between the tractor portion and the trailer portion; and
an electronic controller adapted to:
receive an electronic status signal indicative of a pneumatic pressure in the supply line; and
control communication of the pneumatic control signal between the tractor portion and the trailer portion via the valve based on the pneumatic pressure in the supply line.

14. The system for controlling a pneumatic control signal as set forth in claim 13, wherein the electronic controller is adapted to:
control communication of the pneumatic control signal between the tractor portion and the trailer portion via the valve based on the pneumatic pressure in the supply line and a service brake demand.

15. The system for controlling a pneumatic control signal as set forth in claim 13, wherein:
the valve is a modulator valve.

16. The system for controlling a pneumatic control signal as set forth in claim 13, wherein:
the associated electronic control system is an automatic braking system.

17. The system for controlling a pneumatic control signal as set forth in claim 16, wherein:
if the electronic status signal received at the electrical input indicates the pneumatic pressure in the supply line is below a predetermined supply pressure, the electronic controller is adapted to:
control the communication of the pneumatic control signal by causing the communication of the pneumatic control signal between the tractor portion and the trailer portion to cease; and
if the electronic status signal received at the electrical input indicates the pneumatic pressure in the supply line is at least the predetermined supply pressure, the electronic controller is adapted to:
during a non-automatic braking event, control the communication of the pneumatic control signal by causing the communication of the pneumatic control signal between the tractor portion and the trailer portion to occur; and
during an automatic braking event, control the communication of the pneumatic control signal by causing the communication of the pneumatic control signal between the tractor portion and the trailer portion to modulate.

18. The system for controlling a pneumatic control signal as set forth in claim 17, wherein the electronic controller is adapted to:
cause the communication of the pneumatic control signal between the tractor portion and the trailer portion to modulate by electronically controlling the valve to modulate between an open state and a closed state.

19. The system for controlling a pneumatic control signal as set forth in claim 13, wherein:
if the electronic status signal received at the electrical input indicates the pneumatic pressure in the supply line is below a predetermined supply pressure, the electronic controller is adapted to:
control the communication of the pneumatic control signal by causing the communication of the pneumatic control signal between the tractor portion and the trailer portion to cease; and
if the electronic status signal received at the electrical input indicates the pneumatic pressure in the supply line is at least the predetermined supply pressure, the electronic controller is adapted to:
control the communication of the pneumatic control signal by causing the communication of the pneumatic control signal between the tractor portion and the trailer portion to occur.

20. The system for controlling a pneumatic control signal as set forth in claim 17, wherein:
the electronic controller includes:
an electrical input; and
an electrical output;
the electronic controller is adapted to:
receive the electronic status signal at the electrical input; and
control the communication of the pneumatic control signal by one of transmitting and not transmitting an electronic control signal from the electrical output to the valve.

21. The system for controlling a pneumatic control signal as set forth in claim 20, wherein if the electronic status signal received at the electrical input indicates the pneumatic pressure in the supply line is at least the predetermined supply pressure, the electronic controller is adapted to:

during a braking event controlled by the associated electronic control system, alternately transmit and not transmit the electronic control signal to the valve to cause the valve to modulate between an open state and a closed state.

22. The system for controlling a pneumatic control signal as set forth in claim 21, wherein:
the pneumatic control signal is transmitted between the tractor portion and the trailer portion while the valve is in the open state; and
the pneumatic control signal is not transmitted between the tractor portion and the trailer portion while the valve is in the closed state.

23. The system for controlling a pneumatic control signal as set forth in claim 20, wherein:
when the electronic control signal is not received by the valve, the valve is set to communicate the pneumatic control signal between the tractor portion and the trailer portion; and
when the electronic control signal is received by the valve, the valve is set to not communicate the pneumatic control signal between the tractor portion and the trailer portion.

24. The system for controlling a pneumatic control signal as set forth in claim 17, wherein:
if the electronic status signal indicates the pneumatic pressure of the pneumatic fluid in the supply line is below the predetermined supply pressure, the electronic controller is adapted to alert an operator in the tractor portion that the pneumatic pressure is below the predetermined supply pressure.

25. A system for controlling a pneumatic control signal communicated between a tractor portion of an articulated vehicle and a trailer portion of the articulated vehicle, the system comprising:
a valve, on the tractor portion, included in an associated electronic control system;
a supply line, selectively fluidly communicating with the valve on the tractor portion, communicating a pneumatic fluid between the tractor portion and the trailer portion; and
means for controlling fluid communication of the pneumatic control signal between the tractor portion and the trailer portion based on a pneumatic pressure in the supply line and a service brake demand.

26. The system for controlling a pneumatic control signal as set forth in claim 25, wherein the means for controlling fluid communication includes:
an electronic controller adapted to transmit an electronic control signal to the valve, based on the pneumatic pressure in the supply line, for controlling delivery of the pneumatic control signal between the towing portion of the vehicle and the towed portion of the vehicle.

27. The system for controlling a pneumatic control signal as set forth in claim 26, wherein the electronic controller includes:
an electrical input that receives an electronic status signal indicative of the pneumatic pressure in the supply line; and
an electrical output that transmits the electronic control signal to the valve.

28. The system for controlling a pneumatic control signal as set forth in claim 25, wherein:
the means for controlling does not fluidly communicate the pneumatic control signal between the towing portion of the vehicle and the towed portion of the vehicle if the pneumatic pressure in the supply line is below a predetermined supply pressure.

29. The system for controlling a pneumatic control signal as set forth in claim 28, further including:
means for alerting an operator in the tractor if the pneumatic pressure in the supply line is below the predetermined supply pressure.

30. The system for controlling a pneumatic control signal as set forth in claim 25, wherein:
the supply line selectively fluidly communicates with the valve on the tractor portion via a service foot brake control valve.

31. A method for controlling a pneumatic control signal communicated between a tractor portion of an articulated vehicle and a trailer portion of the articulated vehicle, the method comprising:
receiving an electronic status signal indicative of a pneumatic pressure in a supply line communicating a pneumatic fluid between the tractor portion and the trailer portion; and
controlling communication of the pneumatic control signal between the tractor portion and the trailer portion based on the electronic status signal and a service brake demand.

32. The method for controlling a pneumatic control signal as set forth in claim 31, wherein the controlling step includes:
controlling a valve between an open state, for communicating the pneumatic control signal between the tractor portion and the trailer portion, and a closed state, for preventing communication of the pneumatic control signal between the tractor portion and the trailer portion.

33. The method for controlling a pneumatic control signal as set forth in claim 32, wherein the controlling step includes:
if the electronic status signal indicates the pneumatic pressure in the supply line is below a predetermined supply pressure, controlling the valve to be in the closed state;
while an automatic braking event controlled by an electronic control system is active, if the electronic status signal indicates the pneumatic pressure in the supply line is at least the predetermined supply pressure, modulating the valve between the open state and the closed state;
while the automatic braking event is not active, if the electronic status signal indicates the pneumatic pressure in the supply line is at least the predetermined supply pressure, controlling the valve to be in the open state.

34. The method for controlling a pneumatic control signal as set forth in claim 31, further including:
alerting an operator if the pneumatic pressure in the supply line is below a predetermined supply pressure.

35. An electronic controller, comprising:
an electrical input; and
an electrical output;
the electronic controller being adapted to:
receive an electronic status signal at the electrical input, the electronic status signal being indicative of a pneumatic pressure in a supply line communicating a pneumatic fluid between a towing portion of a vehicle and a towed portion of the vehicle; and
transmit an electronic control signal from the electrical output to an associated valve for protecting a pneumatic control signal communicated from the towing portion of the vehicle to the towed portion of the vehicle if the electronic status signal indicates the pneumatic pressure in the supply line is below a predetermined supply pressure and if service braking is demanded.

* * * * *